US 7,899,816 B2

(12) United States Patent
Kolo et al.

(10) Patent No.: US 7,899,816 B2
(45) Date of Patent: Mar. 1, 2011

(54) SYSTEM AND METHOD FOR THE TRIAGE AND CLASSIFICATION OF DOCUMENTS

(76) Inventors: Brian Kolo, Leesburg, VA (US); Ed Buhain, Fairfax, VA (US); Chad Koslow, Centreville, VA (US); Scott Hueseman, Fairfax, VA (US); Andrew Fisher, Dulles, VA (US)

(*) Notice: Subject to any disclaimer, the term of this patent is extended or adjusted under 35 U.S.C. 154(b) by 427 days.

(21) Appl. No.: 11/892,594

(22) Filed: Aug. 24, 2007

(65) Prior Publication Data

US 2008/0052289 A1 Feb. 28, 2008

Related U.S. Application Data

(60) Provisional application No. 60/839,707, filed on Aug. 24, 2006.

(51) Int. Cl.
*G06F 7/00* (2006.01)
*G06F 17/30* (2006.01)

(52) U.S. Cl. .................. 707/729; 707/730; 707/731

(58) Field of Classification Search ............... 707/7, 707/723, 728, 729, 730, 731
See application file for complete search history.

(56) References Cited

U.S. PATENT DOCUMENTS

| 5,717,914 | A | * | 2/1998 | Husick et al. ............... 707/5 |
| 5,940,624 | A | * | 8/1999 | Kadashevich et al. ......... 704/9 |
| 5,983,221 | A | * | 11/1999 | Christy ...................... 707/5 |
| 6,208,993 | B1 | * | 3/2001 | Shadmon ................. 707/102 |
| 6,675,159 | B1 | * | 1/2004 | Lin et al. ..................... 1/1 |
| 7,020,782 | B2 | * | 3/2006 | Rajasekaran et al. ....... 726/22 |
| 2005/0004943 | A1 | * | 1/2005 | Chang .................. 707/104.1 |
| 2005/0246625 | A1 | * | 11/2005 | Iyengar et al. ............ 715/512 |

* cited by examiner

*Primary Examiner*—John E Breeene
*Assistant Examiner*—Mark E Hershley
(74) *Attorney, Agent, or Firm*—Patton Boggs LLP (57) ABSTRACT

A technique is provided for the classification of a document based on a lexicon structured into categories. Terms in the document may be matched with terms in the lexicon along with the relative position of the term in the document. A weight function may be used to compute a score for each category. The normalized category scores may be used to classify the content of the document.

38 Claims, 4 Drawing Sheets

SYSTEM AND METHOD FOR THE TRIAGE AND CLASSIFICATION OF DOCUMENTS

This application claims priority to U.S. Provisional Patent Application Ser. No. 60/839,707 entitled "System and Method for the Triage and Classification of Documents", filed Aug. 24, 2006, which is incorporated herein by reference in its entirety.

FIELD OF THE INVENTION

This invention relates to methods and systems for creating, searching and classifying large data collections, and more particularly to methods and systems for classifying a document into one of several predetermined or dynamic categories.

BACKGROUND OF THE INVENTION

Existing data mining techniques may be frustrated by large document warehouses. Large document warehouses often may not be rapidly and readily searched due to their large volumes. Organizations may have several million unsearched documents on hand that are out of reach of present data mining techniques.

Current networking and research technologies create the possibility for obtaining large document data warehouses via internet data transfer. Searching these documents, however, poses many challenges due to the size of the warehouse and the constant influx of new documents.

Generally, needs exist for improved methods and systems for creating, searching, and classifying the documents contained in large data collections.

SUMMARY OF THE INVENTION

Embodiments of the present invention are directed toward quickly classifying a document into one of several predetermined categories.

Embodiments of the present invention are also directed toward classifying a document into a set of predetermined categories, the classification containing a weight for each category.

Embodiments of the present invention are also directed toward classifying a document into one of several categories, where the categories are dynamic and evolve based on examination of previous documents.

Embodiments of the present invention are also directed toward classifying a document into a set of categories, where the categories are dynamic and evolve based on examination of previous documents.

Embodiments of the present invention are also directed toward triage of a data warehouse.

Embodiments of the present invention solve many of the problems and/or overcome many of the drawbacks and disadvantages of the prior art by providing methods and systems for searching large data collections and classifying the documents contained therein.

In particular, embodiments of the invention provide methods and systems for searching data collections including providing a lexicon comprising one or more lexicon terms wherein the one or more lexicon terms are each members of one or more categories and are associated with category information, identifying a document comprising one or more document terms, comparing the one or more document terms with the one or more lexicon terms, determining which, if any, of the one or more document terms match the one or more lexicon terms, calculating a score for each of the one or more categories using the matched terms and the category information associated with corresponding lexicon terms, and outputting a result of the calculating step.

In embodiments of the present invention the lexicon may be presorted.

The comparing step may include looking up each of the one or more document terms in the lexicon or looking up each of the one or more lexicon terms in the document.

In embodiments of the present invention, the associated category information may include a weight.

One or more of the lexicon terms may be groups of words where the comparing step also includes checking a first document term with a first lexicon term in the group of words and checking subsequent document terms with subsequent lexicon terms in a group of words until the last lexicon term in the group of words is checked.

An exact match between a document term and a lexicon term may not be required.

In various embodiments of the present invention the lexicon may be static or dynamic. If the lexicon is dynamic, the lexicon may be initialized with a set of one or more fixed lexicon terms.

Embodiments of the present invention may record relative distances of the matched terms from members of the set of one or more lexicon terms, calculate a moment based upon the relative distances, compare the moment to a threshold, calculate additional moments based upon relative distances of subsequent terms matched with additional terms whose moment meets the requirements of the threshold, and update the associated category information based upon a weight assigned to the one or more lexicon terms and the moments and any additional moments.

The steps of the present invention may be repeated to classify one or more additional documents from a subset of one or more documents in a data warehouse.

Embodiments of the present invention may track positions of matched terms in the document, and compute relative positions of matched terms in the document and storing the relative positions as part of the associated category information.

The comparing step may use a logarithmic search.

The associated category information may include weights. The weights may be determined from a weighted term value and/or a relative position of the term in the document. The calculating may include combining the weights for each matched term to create a category score and normalizing the category scores. The associated category information may also include relative position information.

The lexicon may be a thesaurus.

The calculating may include determining a most likely category match.

Alternative embodiments of the present invention may be a computer implemented method for classifying documents including identifying one or more initial documents, identifying one or more initial document terms within the one or more initial documents, recording relative frequencies of the one or more initial document terms, providing a threshold, determining whether the relative frequencies of the one or more initial document terms meet the threshold, adding one or more initial document terms that meet the threshold to a lexicon wherein the one or more initial document terms become one or more lexicon topics, assigning an individual weight to each of the one or more lexicon topics, comparing one or more additional document terms from one or more additional documents with the one or more lexicon topics, determining which, if any, of the one or more additional document terms match the one or more lexicon topics, recording the matched terms and weights associated with the corresponding lexicon topic, calculating a score for each of the one or more lexicon topics using the weights, and outputting a result of the calculating step.

Embodiments of the present invention may include updating the weights based upon relative frequencies of the one or more additional document terms in the one or more additional documents.

The lexicon may be updated by adding matched terms whose relative frequency meets the threshold or updating the lexicon by removing one or more lexicon topics whose relative frequency no longer meets the threshold.

In embodiments of the present invention, an individual weight of the lexicon topics may be the relative frequency of the one or more lexicon topics.

Alternative embodiments of the present invention may be a computer implemented method for classifying documents including providing a lexicon comprising one or more lexicon terms with associated category information, identifying a set of one or more documents, identifying one or more document terms within a document from the set of one or more documents, comparing the one or more document terms with the one or more lexicon terms, updating the associated category information based upon relative frequencies of the one or more document terms in the document, determining which, if any, of the one or more document terms match the one or more lexicon terms, recording the matched terms and associated category information, calculating a score for each of the one or more categories using the associated category information, and outputting a result of the calculating step.

Embodiments of the present invention may include repeating the steps of identifying one or more document terms within the document through outputting results of the calculating for each document in the set of one or more documents.

The lexicon may be updated by adding matched terms that meet a threshold, modifying the weight of one or more lexicon terms that no longer meet a threshold, or even entirely removing a lexicon term that falls below a threshold value.

In embodiments of the present invention, a most likely category match may be determined during the calculating step.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE INVENTION

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Embodiments of the present invention may generally follow the steps of: creating a lexicon, sorting the lexicon, identifying a document, searching the document, tracking position of lexicon terms in the document, and computing category membership.

In a large document warehouse, document triage may improve the search capabilities for the warehouse. By classifying the documents into various categories, a subset of the warehouse may be isolated and searched independently. Reducing the number of documents may allow a search engine to more efficiently examine a given subset of the warehouse.

Embodiments of the present invention may be directed toward a method of classifying documents. A document may be defined as a series of words. A given word in a document may be examined in isolation, or a document term may be identified that includes a given word and a series of words following the given word. Additionally, a word group may be identified as the words in the vicinity of a given word, both before and/or after the given word.

A classification engine may be used to compute a classification of a document. The classification engine may use a lexicon of terms to facilitate the classification process.

The lexicon may be either static or dynamic. In a static lexicon, the lexicon terms and structure may be determined before any documents are classified and do not change as documents are classified. Static lexicons may be preferred when the general content of the documents are know as well as the specific areas of interest. Dynamic lexicons may vary the content of the lexicon as documents are examined. This type of lexicon may be useful when the general content of the documents are not known.

Static Lexicon

First, a predetermined structured lexicon may be identified. The lexicon may be structured into categories. These categories may be the possible categorization of a document. Next, a set of terms may be associated with each category. In a preferred embodiment, each term may be given a weight expressing the degree of membership to a category. This weight may be a simple number, or the weight may be part of a fuzzy logic analysis. A term may belong to more than one category, and the membership weight may be different for each category.

A classification engine may use the lexicon to classify documents. To facilitate this, the classification engine may sort the lexicon terms into alphabetical order. This may allow the classification engine to use a logarithmic search to determine if a specific term is contained in the lexicon. A logarithmic search is a search method that scales logarithmically as the number of terms in the lexicon is increased. Logarithmic search methods are preferred over linear and quadratic search methods because logarithmic search methods have a superior scaling behavior and are more tolerant to large databases.

When sorted, each term may contain a reference to which categories the term belongs to and the weight for each category. The weights need not be positive, and a term may belong to a category with a zero or negative weight.

Next, a document may be identified for classification. The document may be identified by a computer operator, or it may be identified by an automated process. Once identified, the document may be presented to the classification engine.

The classification engine may examine the document and may find terms of the document matching terms in the lexicon. Because the lexicon is preferably presorted, the classification engine may efficiently look up each document term in the lexicon. If desired, however, the classification engine may look up each lexicon term in the document.

In a preferred embodiment, each term in the document may be checked against the lexicon. This may be efficient as the lexicon is preferably presorted. A term in the lexicon need not be a single word, but may be a phrase or number. Because a lexicon term may be a phrase, it may be useful to break each term of the lexicon into a series of individual words. The first word appearing in each term may be recorded and a sorted list of these terms may be retained. Thus, when examining a document, each individual word in the document may be checked against this list. If a matching term is found, the next lexicon word may be checked against the next document word. If these match, the process may be continued until each word in the lexicon term is checked. If each word in the lexicon term matches, in order, the terms in the document, there is an exact match.

An exact match may not be necessary for a matching lexicon term, however. A fuzzy logic process may be used to match a given term in the document with a term in the lexicon. For example, a match may be declared when a specified percentage of words in the lexicon term match with a word group in the document.

The classification engine may identify terms in the document matching terms in the lexicon. The classification engine may track each matched term, along with the word position of that term within the document. Thus, after examination of a document, the classification engine may complete a list of matched terms. In a preferred embodiment, the classification engine may also complete a list of the word position of the beginning of each matched term in the document.

In a preferred embodiment, the classification engine may compute the relative position of each matched term in the document. This may be computed by dividing the word position of each matched term by the length of the document. For example, a matched term may be specified to be 0.05 or 5% from the beginning of the document.

After the classification engine identifies all matched terms, a score may be computed for each category. In a preferred embodiment, the score for each matched term may be computed and added to category score. Once the contribution for each matched term is tallied, the category scores may be normalized by dividing each category score by the sum of all category scores. Thus, the classification engine may determine a score of 0.27 or 27% for a 'Science' category.

In a preferred embodiment, the score for a matched term may be computed from a function of the weight of the term and the relative position of the term in the document. From experience, the most useful score for a matched term may be computed by multiplying the weight by a weight function, where the weight function is a positive axis Cauchy distribution scaled to the range [0,1]. Equation 1 may provide a mathematical representation of this scoring method, where $w_i$ is the weight of the lexicon term and x is the relative position of the term in the document. Experimentation has revealed $\gamma=1$ as a good choice for the parameter, however, variation of this parameter by 20%, or preferably 10% or most preferably 5% is also an acceptable choice.

$$Score_i = w_i \frac{2\gamma(1-x)^2}{\pi(x^2 + \gamma^2(1-x)^2)} \quad (1)$$

Additionally, several other scoring methods have met with considerable success. Simplest of all is a constant weight function resulting in the score for the term. The constant weight function may be simply the weight of the lexicon term as show in Equation 2.

$$Score_i = w_i \quad (2)$$

Next, the linear function from Equation 3 may provide a suitable weight. Here, the function is chosen so that words found at the beginning of the document have a weight of $\alpha-\beta$. Experimentation has revealed $\alpha=2$, b=1 as a good choices for the parameters; however, variation of these parameters by 20%, or preferably 10% or most preferably 5% are also acceptable choices.

$$Score_i = w_i(\alpha - \beta x) \quad (3)$$

Finally, an inverted scaled Gaussian function as in Equation 4 may also provide a suitable weight. In Equation 4 words found at the beginning and end of the document are given a higher weight than those found in the middle. This may reflect the concept that terms found at the beginning of a document are useful for classifying the document because these terms typically introduce the reader to the content of the document. Additionally, words appearing at the end of the document may be useful for classifying the document because these terms typically summarize the document. Terms found in the body of the document may be less useful as they refer to very specific portions of the document and are more likely to stray from the central topic of the document content. Experiment has shown $\alpha=0.7$, $\beta=1/32$ as good choices for the parameters; however, variation of these parameters by 20%, or preferably 10% or most preferably 5% are also acceptable choices.

$$Score_i = w_i\left(1 - \alpha e^{-\frac{\beta}{x^2(1-x)^2}}\right) \quad (4)$$

In a preferred embodiment, after the contributions for each matched term are tallied for the categories, the categories may be normalized. This process may be completed by first summing the values for each category. Then each category value may be divided by the sum to compute the normalized category value. This value may represent the relative weight for a given category.

If it is desired to compute a single category for the document, the category with the highest weight may be chosen. This may be useful in document triage to pigeonhole each document into a single category for later analysis.

Dynamic Lexicon

An embodiment with a dynamic lexicon may examine each document in the same manner as the static lexicon described above. The lexicon may change over time, however. The lexicon may be updated in response to previous documents processed, user input, or updates to the method of computation.

Fixed Topic Lexicon

The lexicon may be initialized with a set of fixed topics. The fixed topics may be words or word groups that are either predetermined or set by user input.

As documents are examined, fixed topics may be identified within the documents. All other words in the document may be cataloged in relation to their minimum distance from each fixed topic.

A threshold may be set for the total moment of the word relative to each fixed topic. The moment may be calculated using a weight function with use of Equation 5.

$$M_{ijj} = \frac{1}{F} \sum_k w_{ijk}(d_k) \quad (5)$$

where $M_{ijj}$ may be the moment for word i with respect to fixed term j, $w_{ijk}$ may be the weight associated with term i with respect to fixed term j in document k, F may be the total number of documents containing fixed term j, and $d_k$ may be the minimum distance between the word and the fixed term in document k. Preferably, the distance is computed as the number of words in the document between the word and the fixed term. Alternatively, the distance may be computed and the number of sentences, lines, paragraph, or pages appearing between the word and the fixed term.

Empirical analysis has determined that Equation 6 provides a suitable weight function; however, the choice of "100" may vary by 20% or more.

$$w(d) = e^{-d^2/100} \quad (6)$$

If the moment for a word with respect to a fixed term rises above (or below) the threshold, the word may be treated as a synonym for the fixed term. As more documents are analyzed, each word moment may be computed from both the fixed terms and the synonyms of the fixed terms. For convenience, synonyms of fixed terms may be referred to as "first moments".

As further documents are analyzed, new synonyms may be found. These synonyms may correspond to either fixed terms or to first moments. Synonyms to first moments may be designated as "second moments". This process may be continued to define third moments, fourth moments, etc.

A lexicon weight may be associated with each fixed term. Additionally, a lexicon weight may be associated with each moment. The lexicon weight for each moment may be a function of the lexicon weight of the fixed term coupled with the degree of the moment.

A preferred embodiment of the fixed topic lexicon may set the lexicon weight of each fixed term to one. The lexicon weight of each first moment may be set as the moment value as calculated from Equation 6. The lexicon weight of each second moment may be the multiplication of the second moment value multiplied by the moment value of the corresponding first moment. In general, the lexicon weight associated with an nth moment may be the product of all moment values leading back to a fixed term.

In another preferred embodiment of the fixed topic lexicon, the lexicon weight associated with each fixed term may be one (1). The lexicon weight associated with each first moment may be one-half (½). The lexicon weight associated with each second moment may be one-quarter (¼). In general, the lexicon weight associated with the nth moment may be given by Equation 7.

$$\text{weight} = \frac{1}{2^n} \quad (7)$$

where n is the degree of the moment.

Dynamic Topic Lexicon

In the dynamic topic lexicon embodiment, there may be no set initial fixed topics. Topics may be determined by analyzing one or more documents and determining the relative frequencies of terms within the document. If the relative frequency of a topic rises above (or below) a set threshold, the topic may be added to the lexicon.

In a preferred embodiment, the lexicon weight of each topic in the lexicon may be one (1). In another preferred embodiment, the lexicon weight of each topic may be the relative frequency of the topic as found in the documents examined.

This weight may be modified as more documents are examined. Furthermore, a topic may be removed from the lexicon if its weight falls below (or above) a threshold.

This threshold may be different than the threshold for adding the term to the lexicon. In fact, the removal threshold may be greater than, equal to, or lower than the threshold for adding the term to the lexicon.

In a preferred embodiment of the dynamic topic lexicon, the threshold for removing a topic from the lexicon may be less than the threshold for adding a term to the lexicon. Thus, once a term is added to the lexicon, it will remain in the lexicon unless the relative frequency of the term in future documents decreases from the current value.

Dynamic Hybrid Lexicon

The dynamic fixed topic lexicon method may be combined with the dynamic topic lexicon. As an initial step, a fixed topic lexicon may be created and used to begin classifying documents. The initial topics may be given a large initial weight. In a preferred embodiment, the initial weight may be specified as one (1) as if each of these terms were identified in a series of documents. Furthermore, it may be assumed that the number of documents previously searched is not zero.

For instance, an initial topic 'science' may have a weight set to one (1) and it may be preliminarily assumed 1,000 documents have been searched. The weight mimics searching 1,000 documents and finding the term 'science' in each document. However, there were in fact no documents searched by the classification system at this point; this may be merely an initial seed for the parameters.

Next, the classification engine may search an actual document. If the term 'science' is present in the document, the number of documents searched may be incremented to 1001. The number of documents containing the term 'science' may be incremented to 1001. The weight is then calculated as w=1001/1001=1.

Alternatively, if the classification engine searches an actual document that does not contain the term 'science', the weight may decrease. If the term 'science' is present in the document, the number of documents searched may be incremented to 1001. The number of documents containing the term 'science' remains 100. The weight is then calculated as w=1000/1001=0.999.

Using the scheme as set above may provide a hybrid dynamic lexicon. This lexicon may be initially seeded with a set of terms and an initial set of parameters mimicking the processing of a set of prior documents. After this initial setup, the dynamic topic lexicon may be used to modify the lexicon accordingly.

Lexicon Structure

A well structured lexicon may facilitate the classification of documents. Specifically, well structured lexicons may assist in the assigning of lexicon weights and the relative lexicon weights of topic words or word groups.

An international standard structured thesaurus may assist in the classification algorithm. Standard thesauri are often translated into several foreign languages in a well-ordered manner allowing the classification engine to smoothly transition between documents in a variety of languages. Additionally, well structured thesauri, which are translated into a plurality of foreign languages, may assist in the classification of documents that contain a plurality of languages within a single document.

One such international standard is ISO 2788-1986, with governs monolingual thesauri. This international standard defines a hierarchical relationship between terms to create a well-structured thesauri in a single language.

Another such international standard is ISO 5964-1985, which governs multilingual thesauri. This international standard defines a hierarchical relationship between terms to create a well-structured thesauri in a plurality of languages.

An example implementation of these international standards is the Eurovoc thesaurus. This thesaurus is implemented in sixteen different languages including Spanish, Czech, Danish, German, Greek English, French, Latvian, Italian, Hungarian, Dutch, Polish, Portuguese, Slovene, Finnish and Swedish. Additionally, the Eurovoc thesaurus is temporarily available in Lithuanian and Slovak and an Estonian implementation is planned.

Furthermore, the Eurovoc thesaurus may be easily translated into other languages. The simple structure of the thesaurus may allow individual words or simple phrases to be individually translated in place.

Additionally, the organized structure of the Eurovoc thesaurus may facilitate extension of the thesaurus both in terms of the depth of the detail of the hierarchy (vertical extension), and the broad classification areas (horizontal extension).

The Eurovoc structure as well as its extensibility makes the Eurovoc thesauri an excellent candidate for a static or a dynamic fixed topic lexicon. Additionally, the Eurovoc thesauri may be used as an initial seed for a dynamic lexicon.

Figure 1:
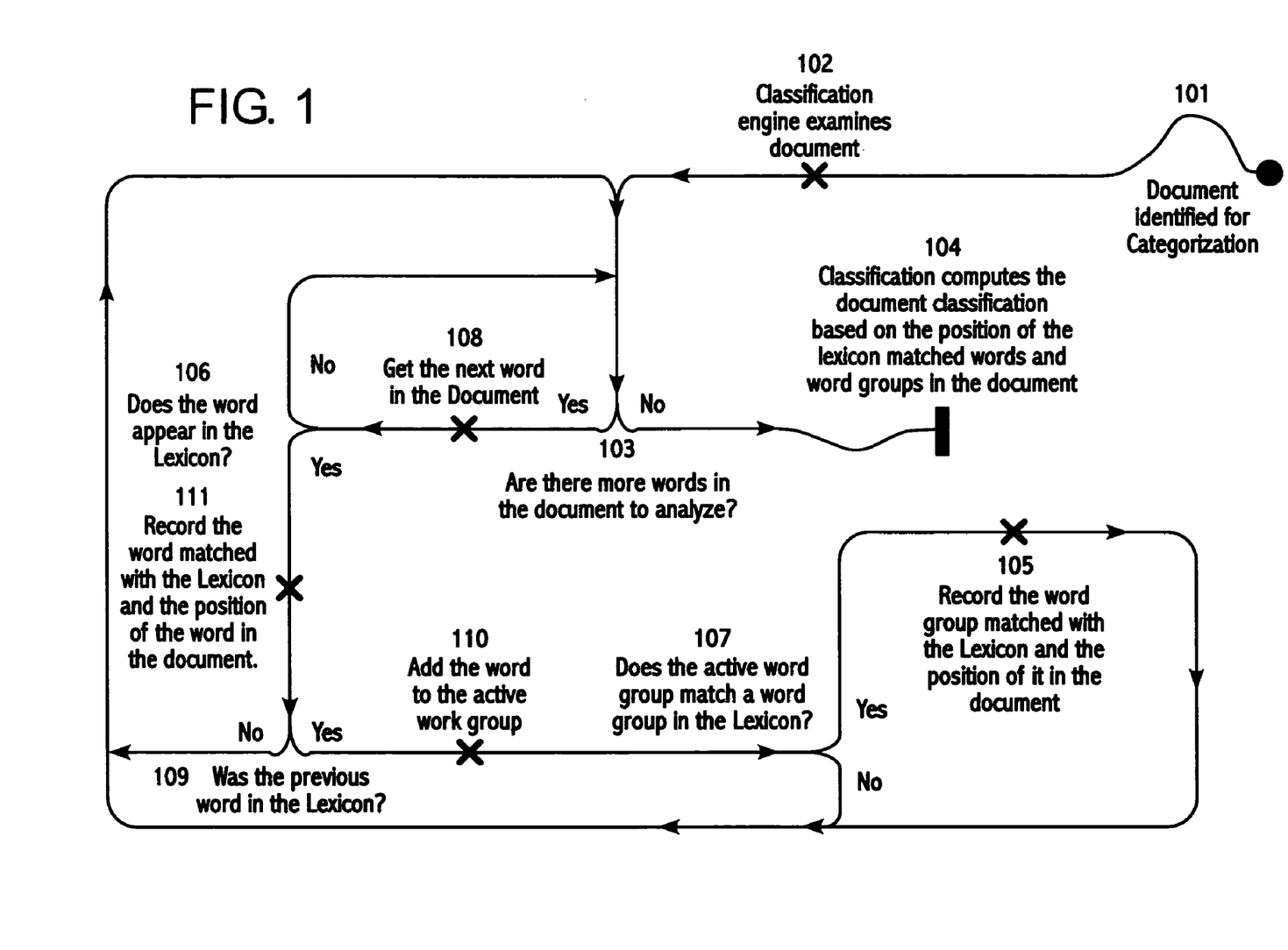
FIG. 1 is a flowchart depicting a process for matching terms in a document with a static lexicon.

FIG. 1 details a method for processing a document using a static lexicon. First, a document may be identified for processing 101. The identification may be made based on user input or input from another computer or software process. Next, the classification engine may examine the document 102 by opening the document and identifying each word in the document. The order of the appearance of each word may be recorded. Starting from the first word, the classification engine may check if there are more words to consider 103. If yes, the classification engine may get the next word 108 (this is the first word in the document if just beginning the process). The classification engine may next check the lexicon 106. If the word does not appear in the lexicon, the classification may repeat by checking if there are more words to consider 103.

If the word does appear in the lexicon, the classification engine may record the word matched and the position of the word in the document 111. Next, the classification engine may check if the previous word considered was also in the lexicon 109. If the previous word was not in the lexicon, the classification engine may return to check if there are more words to consider 103. If the previous word was in the lexicon, the classification engine may add this word to the active word group 110. The active word group may be a group of consecutive or nearly consecutive words appearing in the document where consecutive or nearly consecutive words are all contained in the lexicon.

When an active word group is identified, the classification engine may check if the active word group appears in the lexicon 107. If the active word group does not match a group in the lexicon, the classification engine may repeat by again checking if there are more words to consider 103. If the active word group does match a word in the lexicon, the classification engine may record the word group matched and the position of the word group in the document 105. After recording, the classification engine may repeat by again checking if there are more words to consider 103.

When there are no more words in the document to consider 103, the classification engine may terminate the document examination process by computing the classification of the document based on the position of the lexicon matched words and word groups in the document 104.

Figure 2:
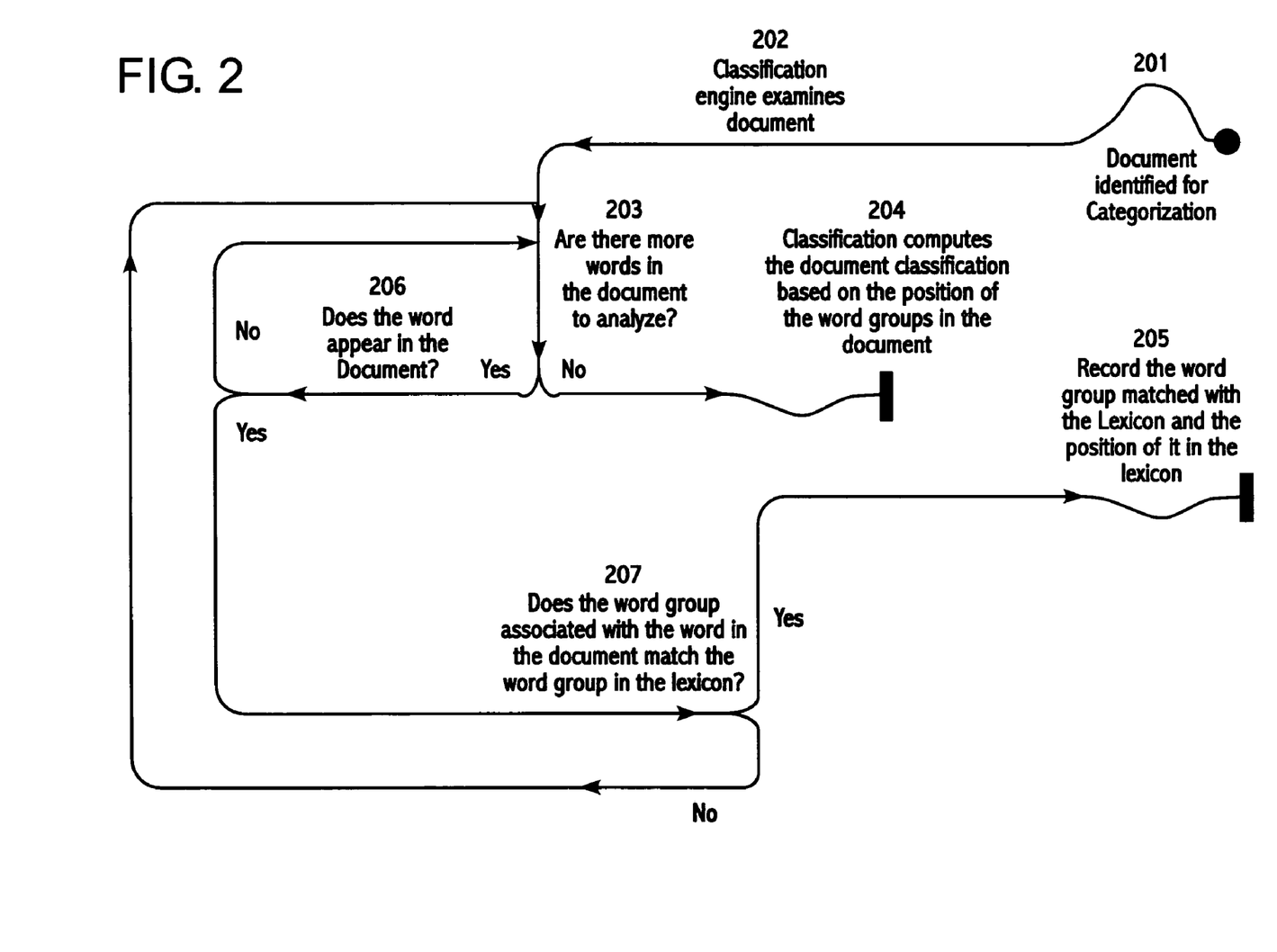
FIG. 2 is a flowchart depicting a static process for documents.

FIG. 2 details a static method for processing a document. First, a document may be identified for categorization 201. Next, the classification engine may examine the document 202 by opening the document and identifying each word in the document. The order of the appearance of each word may be recorded. Starting from the first word, the classification engine may check if there are more words to consider 203. If yes, the classification engine may check if the word appears in the document 206. If the word does not appear in the document, the analysis may repeat by checking if there are more words to consider 203.

If the word does appear in the document, the classification engine may check whether the word group associated with the word on the document matches the word group in the lexicon 207. If yes, the word group matched with the lexicon and the position of the word group matched with the lexicon may be recorded 205. If the word group associated with the word on the document does not match the word group in the lexicon, the classification engine may return to check if there are more words to consider 203.

When there are no more words in the document to consider 203, the classification engine may compute the document classification based on the position of the word groups in the document 204.

Figure 3:
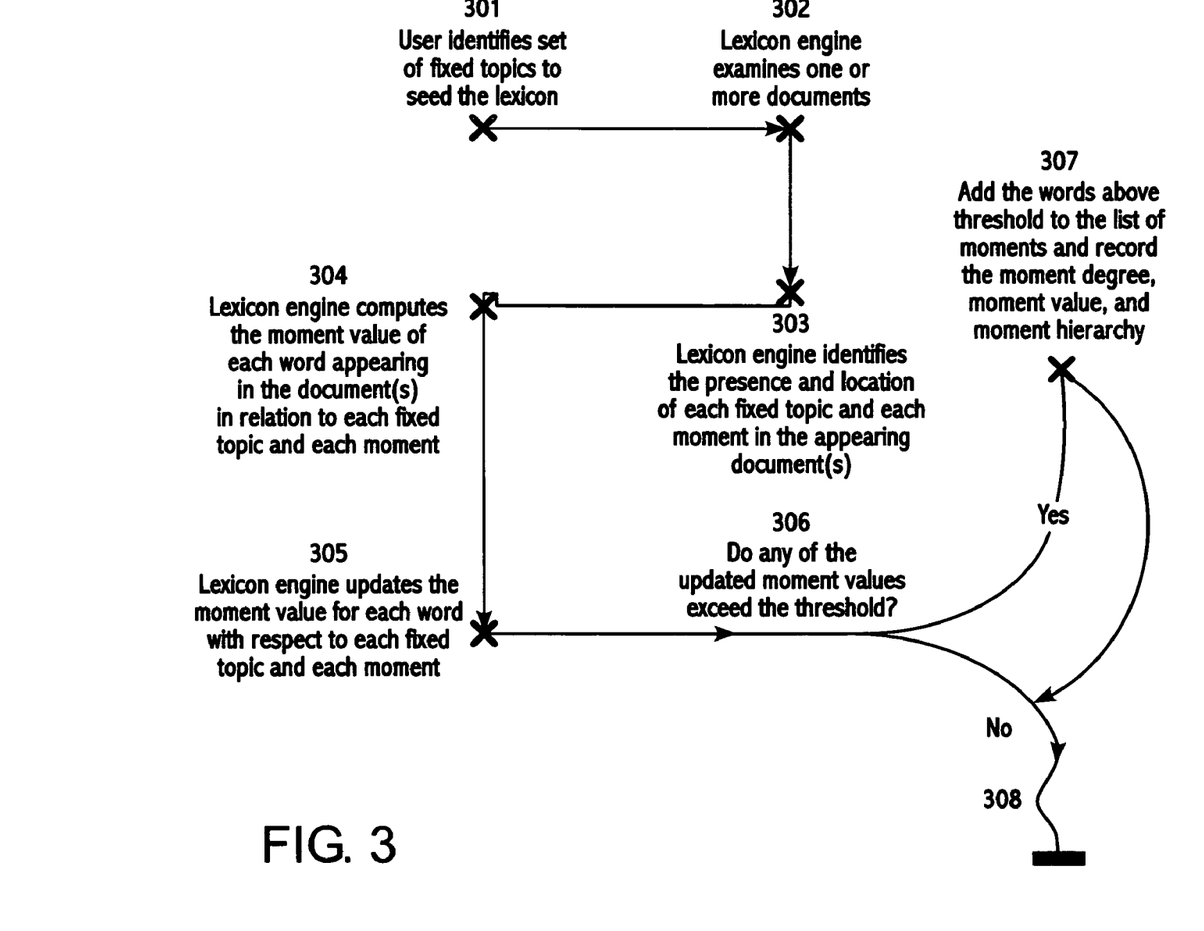
FIG. 3 is a flowchart depicting a fixed topic lexicon.

FIG. 3 describes a method of using a fixed topic lexicon. Initially, a user may identify a set of fixed topics to seed a lexicon 301. A lexicon engine may then examine one or more documents 302. The lexicon engine may identify the presence and location of each fixed topic and each moment in the one or more documents 303. The lexicon engine may compute the moment value of each word appearing in the one or more documents in relation to each fixed topic and each moment 304. The lexicon engine may then update the moment value for each word with respect to each fixed topic and each moment 305. A check may then be made as to whether any of the updated moment values exceed a threshold 306. If yes, the words above the threshold may be added to a list of moments and the moment degree, moment value and moment hierarchy may be recorded 307. If no or after the adding and recording of step 307, the process may complete 308.

Figure 4:
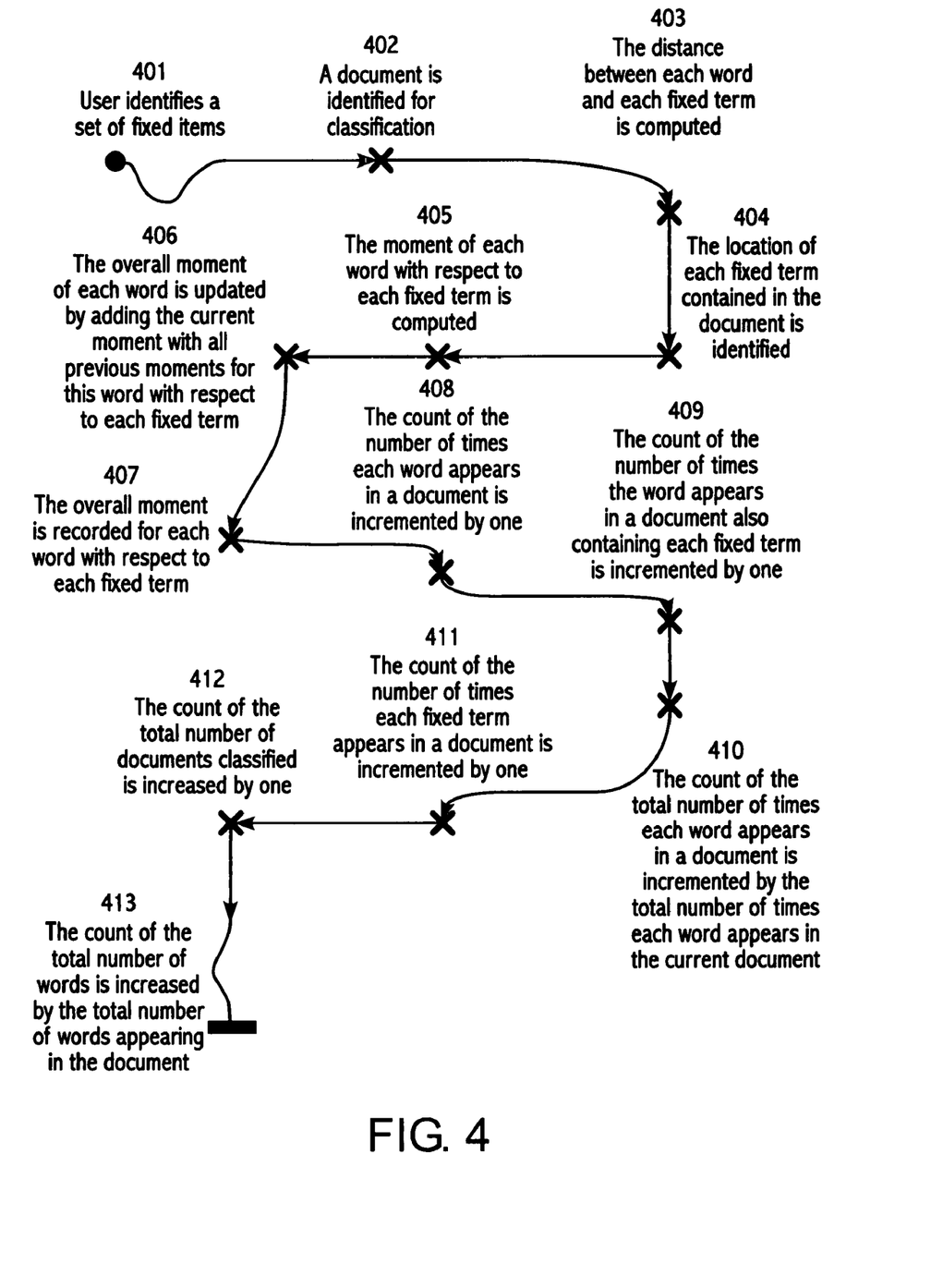
FIG. 4 is a flowchart depicting a method for determining the number of times a term appears in a document.

FIG. 4 describes a method for determining the number of occurrences of a fixed term. Initially, a user may identify a set of fixed terms 401. A document may be identified for classification 402. The distance between each word and each fixed term may be computed 403. The location of each fixed term contained in the document may be identified 404. The moment of each word with respect to each fixed term may be computed 405. The overall moment of each word may be updated by adding the current moment with all previous moments for the word with respect to each fixed term 406. The overall moment may be recorded for each word with respect to each fixed term 407. The count of the number of times each word appears in a document may be incremented by one (1) 408. The count of the number of times the word appears in a document also containing each fixed term may be incremented by one (1) 409. The count of the total number of times each word appears in a document may be incremented by the total number of times each word appears in the current document 410. The count of the number of times each fixed term appears in a document may be incremented by one (1) 411. The count of the total number of documents classified may be increased by one (1) 412. The count of the total number of words is increased by the total number of words appearing in the document 413.

It should be appreciated that the particular implementations shown and described herein are illustrative of the invention and its best mode and are not intended to otherwise limit the scope of the present invention in any way. Indeed, for the sake of brevity details of the potential forms of the documents have been ignored. These documents may be presented in a common format such as a text file, MS Word, Adobe Acrobat, a MS Office product, or any other computer readable format.

It should be appreciated that the words, word groups, and lexicons described are not limited to working with English terms but may be used in any language or a combination of languages. English words were used in this document to illustrate the process. In addition, the entity extractor may be capable of working with a plurality of languages simultaneously. This may be implemented by incorporating several languages into the lexicon or fixed terms.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A computer implemented method for classifying a document comprising the steps of:
   providing a single lexicon comprising one or more lexicon terms wherein the one or more lexicon terms are associated with category information, and wherein the category information comprises weights indicating a likelihood that each of the one or more lexicon terms corresponds to each of one or more categories,
   identifying a document comprising one or more document terms,
   comparing the one or more document terms with the one or more lexicon terms,
   determining which, if any, of the one or more document terms match the one or more lexicon terms,
   calculating a score indicating a likelihood that the document belongs to each of the one or more categories using the weights for each of the matched terms,
   outputting a result of the calculating step, and
   calculating additional moments based upon relative distances of subsequent terms matched with additional terms whose moment meets the requirements of the threshold.

2. The method of claim 1, wherein the lexicon is presorted.

3. The method of claim 1, wherein the comparing further comprises looking up each of the one or more document terms in the lexicon.

4. The method of claim 1, wherein the comparing further comprises looking up each of the one or more lexicon terms in the document.

5. The method of claim 1, wherein one or more of the lexicon terms are groups of words.

6. The method of claim 5, wherein the comparing step further comprises checking a first document term with a first lexicon term in the group of words and checking subsequent document terms with subsequent lexicon terms in a group of words until the last lexicon term in the group of words is checked.

7. The method of claim 1, wherein an exact match between a document term and a lexicon term are not required.

8. The method of claim 1, wherein the lexicon is static.

9. The method of claim 1, wherein the lexicon is dynamic.

10. The method of claim 9, wherein the lexicon is initialized with a set of one or more fixed lexicon terms.

11. The method of claim 1, further comprising recording relative distances of the matched terms from members of the set of one or more lexicon terms.

12. The method of claim 11, further comprising calculating a moment based upon the relative distances.

13. The method of claim 12, further comprising comparing the moment to a threshold.

14. The method of claim 1, further comprising updating the associated category information based upon a weight assigned to the one or more lexicon terms and the moments and any additional moments.

15. The method of claim 1, further comprising repeating the steps to classify one or more additional documents.

16. The method of claim 15, further comprising repeating the steps for classifying a subset of one or more documents in a data warehouse.

17. The method of claim 1, further comprising tracking positions of matched terms in the document.

18. The method of claim 17, further comprising computing relative positions of matched terms in the document and storing the relative positions as part of the associated category information.

19. The method of claim 1, wherein the comparing uses a logarithmic search.

20. The method of claim 1, wherein the associated category information comprises weights.

21. The method of claim 20, wherein the weights are determined from a weighted term value and a relative position of the term in the document.

22. The method of claim 20, wherein the calculating comprises combining the weights for each matched term to create a category score.

23. The method of claim 22, further comprising normalizing the category scores.

24. The method of claim 20, wherein the associated category information further comprises relative position information.

25. The method of claim 1, wherein the lexicon is a thesaurus.

26. The method of claim 1, wherein the calculating further comprises determining a most likely category match.

27. A computer implemented method for classifying documents comprising the steps of:
    identifying one or more initial documents,
    identifying one or more initial document terms within the one or more initial documents,
    recording relative frequencies of the one or more initial document terms, providing a threshold, wherein the threshold is a set frequency of the one or more initial document terms in the one or more initial documents, determining whether the relative frequencies of the one or more initial document terms meet the threshold, adding one or more initial document terms that meet the threshold to a lexicon wherein the one or more initial document terms become one or more lexicon topics, assigning an individual weight to each of the one or more lexicon topics, comparing one or more additional document terms from one or more additional documents with the one or more lexicon topics, determining which, if any, of the one or more additional document terms match the one or more lexicon topics, recording the matched terms and weights associated with the corresponding lexicon topic, calculating a score for each of the one or more lexicon topics using the weights, outputting a result of the calculating step, and calculating additional moments based upon relative distances of subsequent terms matched with additional terms whose moment meets the requirements of the threshold.

28. The method of claim 27, further comprising updating the weights based upon relative frequencies of the one or more additional document terms in the one or more additional documents.

29. The method of claim 28, further comprising updating the lexicon by adding matched terms whose relative frequency meets the threshold.

30. The method of claim 28, further comprising updating the lexicon by removing one or more lexicon topics whose relative frequency no longer meets the threshold.

31. The method of claim 27, wherein the individual weight of the lexicon topics is the relative frequency of the one or more lexicon topics.

32. A computer implemented method for classifying documents comprising the steps of:

providing a single lexicon comprising one or more lexicon terms with associated category information, and wherein the category information comprises weights indicating a likelihood that each of the one or more lexicon terms corresponds to each of one or more categories, identifying a set of one or more documents, identifying one or more document terms within a document from the set of one or more documents, comparing the one or more document terms with the one or more lexicon terms, updating the associated category information based upon relative frequencies of the one or more document terms in the document, determining which, if any, of the one or more document terms match the one or more lexicon terms, recording the matched terms and associated category information, calculating a score indicating a likelihood that the document belongs to each of the one or more categories using the weights for each of the matched terms, outputting a result of the calculating step, and calculating additional moments based upon relative distances of subsequent terms matched with additional terms whose moment meets the requirements of the threshold.

33. The method of claim 32, further comprising repeating the steps of identifying one or more document terms within the document through outputting results of the calculating for each document in the set of one or more documents.

34. The method of claim 32, further comprising updating the lexicon by adding matched terms that meet a threshold.

35. The method of claim 32, further comprising updating the lexicon by removing one or more lexicon terms that no longer meet a threshold.

36. The method of claim 32, wherein the calculating further comprises determining a most likely category match.

37. The method of claim 27, further comprising updating the associated category information based upon a weight assigned to the one or more lexicon terms and the moments and any additional moments.

38. The method of claim 32, further comprising updating the associated category information based upon a weight assigned to the one or more lexicon terms and the moments and any additional moments.

* * * * *